July 8, 1947. J. CHOCHOL 2,423,482
FLUID OPERATED SAFETY CONTROL FOR POWER PRESSES AND THE LIKE
Filed Dec. 21, 1944 3 Sheets-Sheet 1

INVENTOR.
Joseph Chochol
BY
Fraser, Myers & Manley
ATTORNEYS

July 8, 1947.   J. CHOCHOL   2,423,482
FLUID OPERATED SAFETY CONTROL FOR POWER PRESSES AND THE LIKE
Filed Dec. 21, 1944   3 Sheets-Sheet 2
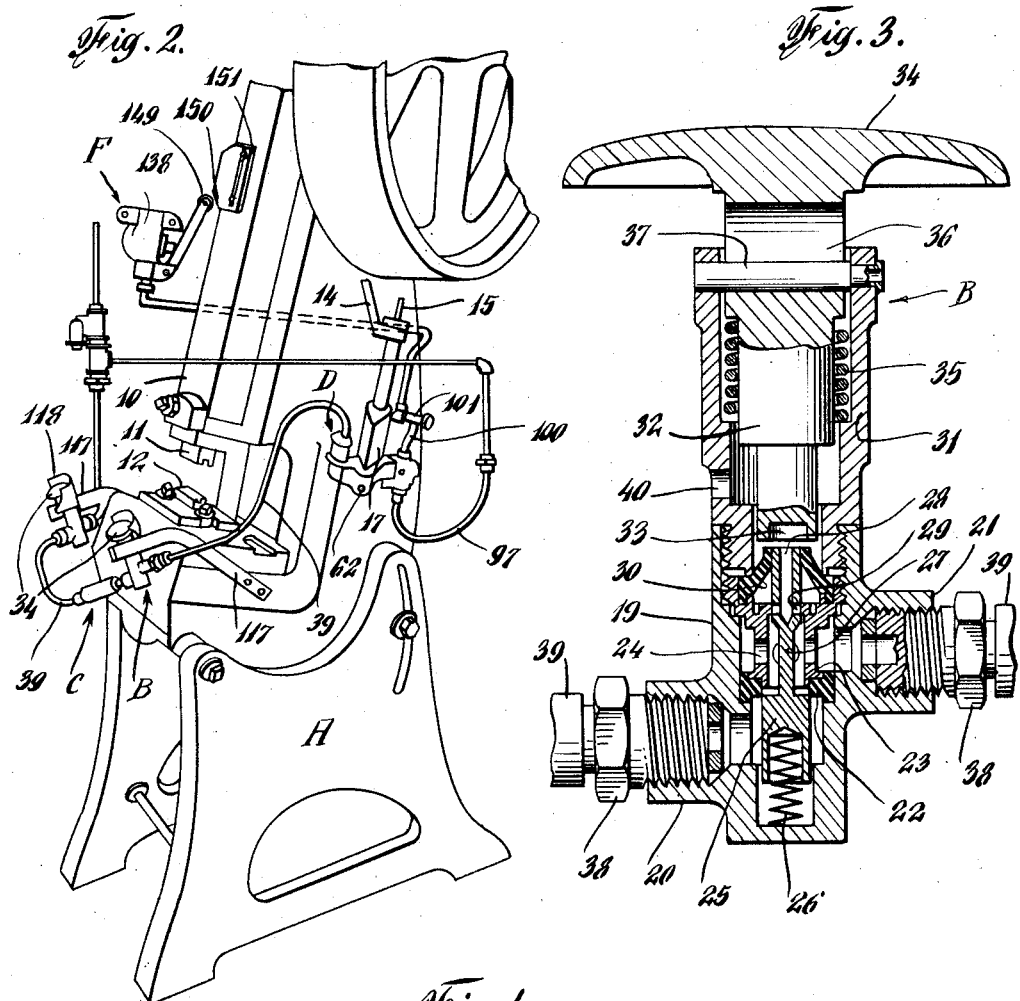
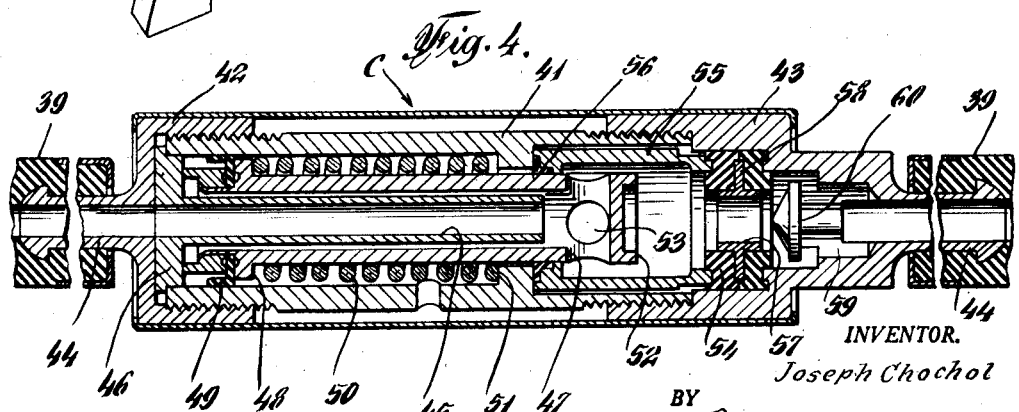
INVENTOR.
Joseph Chochol
BY
Mason, Myers & Manley
ATTORNEYS

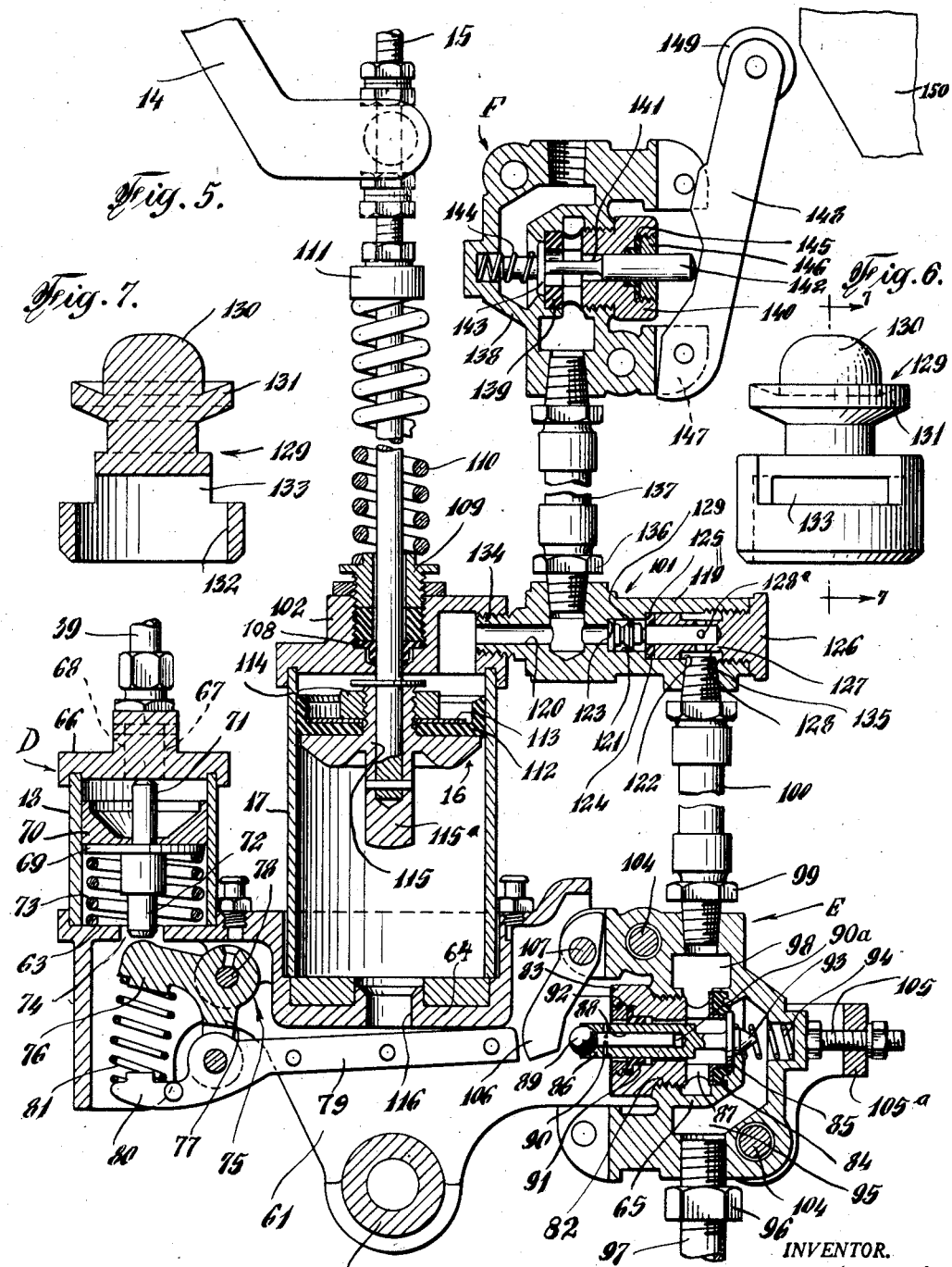

Patented July 8, 1947

2,423,482

UNITED STATES PATENT OFFICE 2,423,482

FLUID OPERATED SAFETY CONTROL FOR POWER PRESSES AND THE LIKE

Joseph Chochol, Brooklyn, N. Y., assignor to Scovill Manufacturing Company, Waterbury, Conn., a corporation of Connecticut Application December 21, 1944, Serial No. 569,245

6 Claims. (Cl. 192—131)

My present invention relates to pneumatic fluid control devices for power presses and the like and aims to provide certain improvements therein.

The prevention of injury to operators of power presses and the like has long received the attention of safety engineers and labor boards and much has been accomplished in recent years to reduce the hazard of personal injury incident to power press operations. Noteworthy contributions in this regard are disclosed in the patents to Williams, Nos. 2,253,544 and 2,268,733, and the present invention constitutes an improvement on the types of press fluid controls disclosed in said patents. The inventive concept disclosed in said patents resides in the use of compressed air to operate a piston plunger for tripping a clutch on the drive shaft of a press by employing a plurality of control valves so disposed with relation to the operating head of the press that both hands of an operator must be used to operate two valves and be well away from the danger zone when doing so, and further, in that said valves are shielded so they can not be accidentally operated.

In Patent No. 2,268,733 aforementioned, a single puff or surge of air is admitted into an operating cylinder and is relied upon to trip the clutch holding means. It has been found, however, that should normal operating conditions vary so that the air pressure suddenly falls, the puff of air which is admitted to the trip plunger operating cylinder is not always sufficient to insure the tripping action. In Patent No. 2,253,544 the possibility of this condition arising is eliminated by relying upon continuously acting air pressure to operate the tripping piston plunger. This is accomplished through the use of a normally spring-seated pilot valve which is adapted to be unseated by a pilot operating means, which, in turn, is adapted to be operated by a puff or surge of compressed air at much lower pressure than is necessary to operate the plunger for tripping the clutch. In said mechanism movement of the piston in the clutch operating cylinder is relied upon to release the pilot operating means whereby to permit the pilot valve to shut off the supply of air pressure to the operating cylinder and, in turn, vent the compressed air therefrom through the pilot or main loading valve to the atmosphere. With said device the action of the piston within the cylinder was uncertain and dependent upon several factors, and varied accordingly. There had to be considered first: the resistance of the clutch arm; second, the air pressure being used at each particular plant in which installations were made; third, the fluctuation of the air line pressure; and fourth, the elapsed time it took for the clutch to actually engage after the trip rod was pulled. This latter point was variable and was dependent upon the R. P. M. of the fly wheel and the number of engaging points built into the clutch. Because of these variable factors, under certain conditions the piston could make a complete stroke downward into the cylinder and back without enabling the clutch to engage or else it would go down so slowly that before it was released the press would make two complete revolutions, i. e., repeat. Although the timing of the piston could be controlled by added spring tension, this was not reliable or positive due to the fatigue which might develop eventually in the spring or due to a drop in the air line pressure the speed of the piston would be retarded in the downward stroke and a repeat might then occur.

With these points in mind an exhaust valve system was developed whereby to time the action of the piston to the speed of the press in a positive manner, i. e., the piston could be held in its downwardly moved position long enough to insure engagement of the clutch upon release of the piston. This method enabled the use of a standard piston assembly unit on practically all types of mechanical clutch machines regardless of the variable factors found in these machines, as outlined above. In said exhaust valve system, a normally closed valve is employed and a cam mounted on a movable part of the press is used to open the exhaust valve for the release of air from the cylinder. In this system, however, the 3-way pilot valve formerly employed is replaced by a 2-way valve since the cylinder must be vented through the exhaust valve and not through the 3-way valve. This exhaust system has proven satisfactory to a major degree, however, should the pilot valve develop a leak, the air would pass through said valve and build up in pressure in the cylinder and trip the clutch, thereby giving rise to a source of accident to an operator or damage to the press.

My present invention has for its object the elimination of the dangers recited in the preceding paragraph. To accomplish this, I restore the 3-way pilot valve and insert in the conduit between the pilot valve and the cylinder a check valve opening to pressure from the pilot valve. With this construction, should a leak develop in the pilot valve, instead of the pressure eventually building up in the cylinder, the air passing the pilot valve will leak out of the venting passage in the 3-way valve.

The principle, construction and operation of the improved safety control device constituting the subject matter of the present invention will be better understood from the detailed description which follows, when considered in connection with the accompanying drawings wherein:

Fig. 2 is a perspective view of the invention applied to a power-operated press.

Fig. 3 is a longitudinal section through one of the manually operable valves used with my invention.

Fig. 4 is an axial section through a cut-out valve used with my invention.

Fig. 5 is a longitudinal section through the clutch operating cylinder, the pilot valve and the pilot valve operating means and the check valve forming part of my invention.

Fig. 6 is an elevation of the valve check per se, disposed in the conduit between the 3-way valve and operating cylinder.

Fig. 7 is an axial section taken along the plane of the line 7—7 of Fig. 6.

Figure 1:
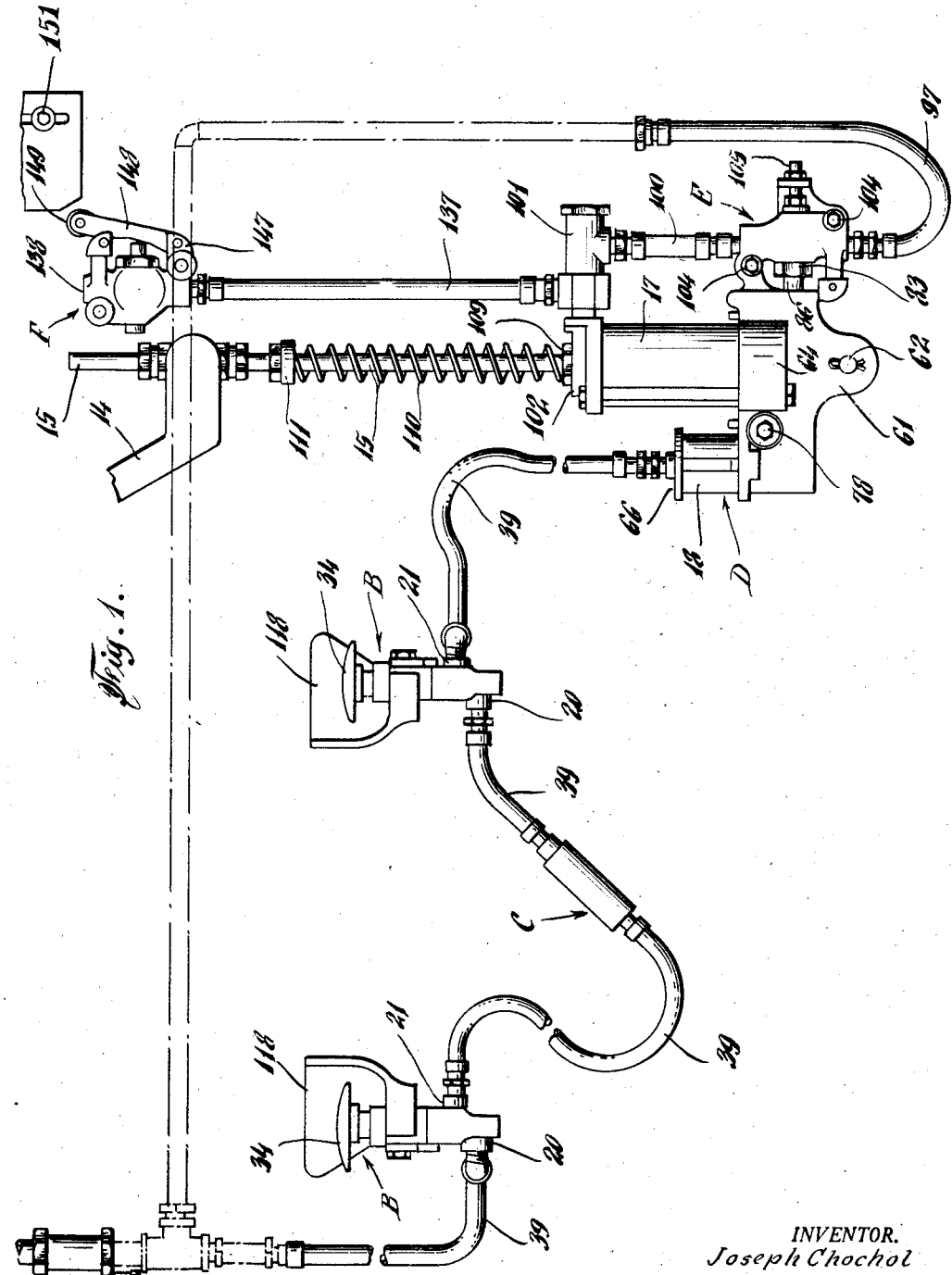
Figure 1 is a schematic arrangement of the invention, the press to which it is applied being omitted.

Although my invention is capable of use with any type of press or machine which has a movable head adapted to move toward and away from a complemental member and between which members the hands of an operator must be positioned in the handling of the work to be operated upon by the machine, I have shown my safety device applied to a power press A of conventional design having a movable head 10 which carries a die 11 for cooperation with a complemental die 12 mounted on the base of the press. The head 10 is reciprocable so as to bring the dies 11 and 12 into operative position to the work being acted upon, and reciprocation of the head being provided by rotation of a shaft (not shown) upon which is mounted a positively-acting clutch (not shown) of any approved type adapted to be tripped by a clutch trip arm 14 carried by a rod 15, one end of which carries a piston 16 mounted in a clutch-operating cylinder 17.

For operating the clutch trip arm only when the hands of the operator are well away from danger, there are provided a pair of manually operable valves B and a cut-out valve C which form part of a pneumatic circuit adapted to supply a puff or surge of compressed air into a cylinder 18 of a pilot valve operating means D for unseating a pilot valve E to admit compressed air from a source directly into the clutch-operating cylinder 17.

The manually operable valves B are identical in construction and each consists of a hollow casing 19 having lateral tubular offsets or projections 20 and 21 providing induct and educt openings, respectively, in the casing. Within the casing between the lateral offsets is a shoulder upon which is mounted a valve packing seat 22 which is held in place by a tubular plug 23 having lateral openings 24 therein, the said plug being screw-threadedly or otherwise held in position within the casing. Mounted within the casing for engagement with the packing seat 22 is a valve check member 25, the lower portion of which is hollowed out and encloses a helical spring 26 for normally holding the valve against its seat. The valve check 25 above the seating portion thereof is formed with an axial pin 27, the upper end 28 of which is of tubular form and of a diameter to snugly slide through the axial opening in the tubular plug 23, and said tubular portion of the pin at its lower end is formed with lateral openings 29. To insure against leakage and to provide an air seal between the top of the tubular plug 23 and the top of the hollow portion 28 of the valve pin 27 I connect said parts together by a cone-shaped packing 30. Any suitable means may be employed for holding this packing in contact with said parts, and as herein shown, the packing which is formed as a separate part, has a sliding fit with the hollow portion of the valve check pin and is held in clamping engagement with the tubular plug 23 by a tubular member 31 which screw-threadedly engages within the casing 19. Mounted for telescopic movement within the tubular member 31 is a plunger 32, the inner end of which is recessed, as at 33, to engage over and seal the open end of the hollow portion of the valve check pin when the plunger is depressed in the act of unseating the valve check 25. The plunger 32 is of a length to extend beyond the top of the tubular member 31 and is normally urged outwardly by a helical spring 35 mounted between a shoulder within the tubular member 31 and a shoulder on the plunger 32 for limiting the extent of the plunger movement. For holding the plunger 32 against separation from the tubular member 31, the plunger is formed with a slot 36 through which extends a pin 37 carried by the tubular member. For facilitating movement of the plunger by the hand of an operator, the plunger at its outer end is provided with an enlarged mushroom head 34. The tubular lateral offsets 20 and 21 are each threaded for connection with screw-threaded nipples 38 attached to sections of hose or flexible conduits 39 forming a part of the pneumatic circuit. The tubular member 31 is also formed with a lateral opening or vent 40, which, it will be observed, provides open communication through the tubular portion 28 of the valve check pin and the lateral openings 24 in the tubular plug 23, with the bore through the lateral offset 21, when the check valve 25 is seated. When the valve check 25 is unseated it will be apparent that this open communication is cut off by the seal provided by the engagement of the lower end of the plunger 32 with the coned packing 30.

The cut-out valve C consists of a casing formed of a central, substantially cylindrical element 41, the ends of which are screw-threadedly connected to tubular end members 42 and 43, each of which terminates in an outwardly-directed nipple 44 to which an end of the conduit or hose 39 is suitably connected. Mounted within the casing provided by the elements 41, 42 and 43, is a tubular member 45 having a bore substantially flush with the bore through the nipple end of the element 42 and having an outwardly-directed flange 46 which is clamped against a flat surface in the element 42 by the screw-threaded connection between said elements 41 and 42. Surrounding the tubular element 43 in slightly spaced relation thereto is a tubular plunger check valve 47, which, at its end adjacent the flange 46, is formed with a flange 48 and carries a piston packing 49 having a diameter to air-tightly move within the cylindrical bore of the element 41.

Surrounding the plunger check valve 47 and bearing at one end against the flange 48 is a helical spring 50, the opposite end of which bears against an inwardly-directed flange 51 on the tubular element 41 for the purpose of exerting a force upon the plunger valve for normally holding it in its unseated position, as shown in Fig. 4.

The plunger valve 47 at its other end is closed and formed with an annular ring 52, rearwardly of which the plunger valve is formed with lateral openings 53 leading from the interior of the tubular plunger to the duct through the cut-out valve. The closed end of the plunger valve is adapted to engage a valve seat packing 54 mounted within the tubular element 43 and held therein by a sleeve 55 which is clamped between the annular flange 51 and said packing in the assembly of the elements 41 and 43, there being also provided a packing 56 between the sleeve 55 and the flange 51, which packing engages the outer wall of the plunger valve 47 to provide an air-tight seal therewith. The packing 54 consists of two washers which are pressed over a tubular sleeve 57 having an outwardly-directed flange or rib 58 intermediate its ends. The element 43 between the nipple 44 thereon and the packing 54 therein is formed with a chamber having a spider 59 for guiding the stem of a valve 60, the face thereof which engages the packing 54 being of conical form and of smaller effective area than the opposite face of said valve. The function for this construction will presently be explained. To prevent tampering with the cut-out valve parts they are housed within a shell 60a having a vent opening 60b. The tubular element 41 also has a vent opening 41a for permitting the venting of any air under pressure which may find its way into said element.

The pilot valve operating mechanism D, the pilot valve E, and the clutch-operating cylinder 17 are all supported upon a base plate or casting 61 which is pivotally mounted to the press frame at 62. The base plate or casting 61 is of such form as to constitute one head 63 of the pilot cylinder 18, one head 64 of the piston-operating cylinder 17, and the housing and support 65 for the pilot valve E.

The pilot cylinder 18 has a top closure head 66 of larger area than the cylinder 18 and is clamped in air-tight engagement therewith through suitable bolts 67, said head having an induct passage 68 in open communication with the pneumatic circuit which includes the valves B, the cut-out valve C and the conduit sections 39. Within the pilot cylinder 18 is a piston plunger 69 carrying a piston packing 70, the piston having axial extensions 71 and 72 on either side thereof, respectively. Encircling the piston extension 72 is a coil spring 73 which bears at one end against the cylinder head 63, and at its opposite end against the piston 69, and normally acts to urge said piston upwardly, and is limited in this action by engagement of the extension 71 with the head 66. The head 63 has an axial opening 74 therein through which the piston extension 72 may pass when the piston is subjected to air pressure. The free end portion of the extension 72 is of reduced diameter and provides a shoulder which serves to limit the extent of the downward movement of the piston within the cylinder.

Mounted within the base plate or casting 61 below the head 63 is a bell-crank lever 75 having arms 76 and 77 and being pivoted substantially at the intersection of said arms at 78. The arm 77 at its free end is bifurcated and has pivotally mounted thereto a trip bar 79, one end 80 of which extends below and in substantially parallel relation to the arm 76, and the portion of the trip bar to the opposite side of the pivot extends below and across the axis of the cylinder head 64. Mounted between the arms 76 and 80 is a compression spring 81 which normally tends to urge said arms apart into their normal position, as shown in Fig. 5.

The housing or body 65 of the pilot valve E is formed with various openings and passages therein, one of which 82 is internally screw-threaded and accommodates a screw nut 83 which has an axial passage therethrough, and at its inner end is provided with an external shoulder which supports a packing gasket 84 which constitutes the seat for a valve check 85, the stem 86 of which slidably extends through the axial opening in the screw nut. The screw nut 83 adjacent the packing gasket 84 is formed with a transverse passage or duct 87, the function for which will presently appear. The valve check stem 86 immediately adjacent the valve check proper is of reduced diameter and the stem proper is hollowed out, as indicated at 88. At its outermost end the valve check stem is formed with a valve seat against which a ball valve 89 is adapted to seat. Inwardly from the ball valve seat, the valve stem is formed with a plurality of lateral openings 90 for establishing communication between the bore of the valve stem and the outer atmosphere. The valve stem 86 also has a transverse passage 90a at the inner end of the bore for establishing communication between the bore in the stem and the axial passage through the screw nut 83. For guiding the valve stem and for insuring a leak-tight sliding fit between it and the bore through the nut 83, the latter is provided with a packing washer 91 and a screw plug 92. The valve check 85 at its innermost end is formed with an axial projection 93 for supporting a coil spring 94 which normally serves to hold the check valve upon its seat. The pilot valve housing 65 is also formed with an internal chamber 95 in open communication with the passage through an adapter nipple 96, to which is connected a conduit 97 leading from a source of compressed air. The housing 65 is also formed with a chamber 98 which is in open communication with an adapter nipple 99 to which is secured a tube or conduit 100, the opposite end of which is connected through a suitable valved fitting 101 with the interior of the cylinder 17 through suitable openings in the head or cover plate 102. The housing 65 is supported in the base plate or casting 61 through the medium of bolts 104, and is definitely located within said base plate by adjustment of a locating bolt 105 extending through a bracket 105a secured to said base plate, the head of the bolt 105 bearing against the housing 65 and being held in said position by a lock nut. Also carried by the housing 65 in a bifurcated lug thereon, is a lever 106 which is pivoted at 107 for limited movement, the free end of said lever being disposed between one end of the trip bar 79 and the ball valve 89, the said lever 106 being limited in its pivoted action and serving as an intermediary element to engage the ball valve, and through it the stem 86 to unseat the check valve 85.

The cylinder head 102 has an axial passage therethrough within which is mounted a gland packing 108 for insuring against air leakage from the cylinder around the plunger rod 15. The gland packing is held in place by a screw-threaded plug 109 which also serves as a bearing for one end of a compression spring 110 mounted on the rod 15, the other end of the spring bearing against a collar 111 which is adapted to be held in fixed position on the rod 15.

The piston 16 consists of a disc-like member having a flat top face upon which is mounted a suitable packing cup 112 adapted for sliding leak-tight engagement with the inner wall of the cylinder 17, the said cup being held on the disc by a clamping plate 113, and a clamping nut 114 which screw-threadedly engages over an axial tubular bushing 115 on the piston disc. The tubular bushing also extends downwardly beyond the opposite side of the disc and constitutes a projection 115a which is adapted to pass through an axial opening 116 in the piston head 64 to engage the trip bar 79 to release the lever 106 and permit the valve check 85 to seat under the tension of the spring 94.

The manually operable valves B may be conveniently attached to the machine by means of brackets 117 which are bolted to the ends of the bed of the press. These brackets may also conveniently carry shields 118 which extend above and partially encircle the mushroom heads 34 of the valves B.

The device hereinbefore described is primarily intended for operation in connection with repeating type clutches to insure but a single operation of the press and is substantially the same as described in United States Patent No. 2,253,544 hereinbefore referred to.

The valved fitting 101 consists of a casing 119 having a bore therethrough of different diameters 120, 121, 122, and providing a shoulder 123 between the bores 120 and 121, and a shoulder 124 between the bores 121 and 122. Seating on the shoulder 124 is a valve seat packing 125 which is held in place thereon by a screw-threaded plug 126 which is imperforate at its outer end and is provided with an axial bore 127 extending inwardly from its inner end. The plug 126 intermediate its ends is formed with an annular recess 128 and with transverse openings 128a for establishing communication between said annular recess and the axial bore 127. Freely slidable within the bore 121 is a valve check member, indicated generally by the reference numeral 129, and best shown in Figs. 6 and 7. Said valve check member has a dome-shaped portion 130 at one end thereof of a diameter to pass through the opening in the valve seat 125, and at the base of said dome-shaped portion is formed with an oblique annular flange 131 which is adapted to engage the valve seat packing 125 to seal the passage through the fitting 101. At its opposite end the valve check member is formed of a diameter to slidably engage within the bore 121 and is formed with an axial passage 132 which communicates with lateral passages 133 formed by cutting away the side walls of the member above its inner end. The valved fitting 101 is suitably connected to the head 102 of the cylinder 17 through a screw-threaded fitting 134 and to the conduit 100 by a screw-threaded fitting 135.

Connected to the valved fitting 101 through a nipple 136 is a conduit 137 for establishing open communication between the bore 120 and a normally closed exhaust valve F. The valve F is a 2-way valve of any desired construction, and as herein shown consists of a housing 138 having a compressible valve seat packing 139 held in position therein by a tubular screw-threaded plug 140 having a passage 141 extending transversely therethrough, the said plug having an axial bore through which slidably extends a valve stem 142 which carries a valve 143 which is normally held in engagement with the valve seat packing 139 by a tension coil spring 144. To prevent leakage through the plug 140 around the valve stem 142 the former is provided with a packing gland 145 which is held within the plug by a screw-threaded plug 146. Pivotally mounted in a bifurcated lug 147 on the housing 138 is a lever 148 which carries at its free end a roller 149 adapted to engage a cam adjustably mounted on a moving part of the press. As herein shown, said cam is designated 150 and consists of a plate which is adjustably mounted on the movable head of the press by a pair of bolts 151. The cam on the movable head of the press is so set that it will coact with the roller 149 to open or unseat the valve 143 as the head of the press completes its down stroke, and will operate to hold said valve open until said head of the press nears its high point or neutral position whereat it will operate to permit said valve to close. In this connection, it will be understood that the exhaust valve F may be suitably mounted on a stationary part of the press so that the aforementioned opening and closing of the valve will take place. When the clutch of the press is tripped, the cam 150 will move downwardly with the head of the press, and upon engaging the roller 149 will move the left arm 148 to open the valve 143 and will thereby release the air from the cylinder 17. The valve 143 will be held open until the rise of the cam has again passed the roller to permit the valve to close under the tension of its spring. The cam being adjustable, it will be appreciated that the timing of the opening and closing of the exhaust valve can be set to satisfy any desired timing for valve operation.

*Operation.*—With the parts assembled and adjusted so that the admission of compressed air into the cylinder 17 will move the plunger 16 inwardly against the tension of the spring 110 to trip the clutch so as to permit the press head to move downwardly, the operation of the device for press control is as follows:

The right hand operating valve B must be pressed down slightly in advance of the left hand valve B or substantially simultaneously therewith. When this is done, the compressed air from the source passes through the pneumatic circuit into the cylinder 18 of the pilot valve operating means and forces the piston therein downwardly, which action causes a rocking of the bell-crank 75 against the tension of spring 81 and moves the trip bar 79 to the right, thereby moving the lever 106 against the ball 89 at the end of valve stem 86 to force the valve check 85 off its seat. When the valve check 85 is unseated, compressed air from the supply line enters into the chamber 95, thence between the open check valve and its seat and through the ducts or passages 87 into the chamber 90, and from there through the conduit 100, through the valved fitting 101 to unseat the valve check 129 therein, and thence into the cylinder 17 to force the piston 16 downwardly, which action trips the clutch and permits the head of the press to move downwardly. As the piston 16 approaches the bottom of the cylinder 17, the axial extension 115a of the piston passes through the opening 116 and depresses the trip bar 79 to permit the lever 106 to move to the left about its pivot due to the movement of the valve stem 86 as the check valve 85 is seated by the tension of its spring 94. Substantially simultaneously with, or immediately after this action takes place, the exhaust valve 143 will be opened as the roller 149 reaches the rise on the cam 150 and will vent the air from the cylinder 17 through duct 120 in fitting 101, tube 137 and exhaust valve F. The exhaust of the air from the cylinder 17 will operate to seat the check valve 129, while the seating of the pilot valve 85 will establish open communication between the valve fitting 101 to the right of the seated check valve 129 and the atmosphere through conduit 100, passages 98, 90a, 88 and 90. The release of the compressed air from the cylinder 17 permits the spring 110 to move the clutch trip arm 14 back into clutch-engaging position, thereby preventing the tripping of the clutch until the piston 16 within the cylinder 17 is again moved downwardly by air pressure. Such downward movement, however, is not rendered possible until both manually operable valves B are permitted to again seat or, in other words, until the operator's hands are withdrawn from the valves and again applied thereto. This will be apparent, for when the operating valves B are opened in the manner specified, a puff or surge of air passes through the pneumatic circuit to act upon the pistons 69, 70 in the pilot valve operating means, and after so acting, the incoming air pressure operates to move the plunger valve 47 of the cut-out valve C against the seat 54, and said valve will remain seated so long as the left hand operating valve B is held open. When the hand is removed from the right hand operating valve B the air from the cylinder 18 will vent through the opening 40 in said valve, the piston 69 will be moved upwardly by spring 73 and the spring 81 will move the bell-crank lever 75 about its pivot and return the trip bar 79 to its normal position.

If either of the manually operable valves B is tied down or held down, further operation of the press will be precluded because, as above described, if the left hand valve B is held down, the plunger valve 47 will remain seated and prevent the passage of air through the pneumatic circuit; while if the right hand valve B is held down, the back pressure from the pilot cylinder 18 will act upon the floating valve 60 to seat the same, and as the effective area of the valve 60 acted upon by this back pressure is greater than the effective area of the seating face of said valve, it will be apparent that a puff or surge of incoming air through the cut-out valve C will be insufficient to unseat the valve 60. Hence, if the right hand operating valve is tied down, the air will be trapped in the cylinder 18, and when the trip bar is depressed by the piston bushing extension 115a, the trip bar will move to the right below the lever 106 where it will remain until permitted to return to normal position by the venting of the compressed air from the cylinder 18.

Should a leak develop in the pilot valve E any air from the supply line which may pass said open or leaky valve would not find its way into the cylinder 17 where it might build up in pressure and trip the press, but on the contrary such air passing the pilot valve will leak out through the venting passages 90 in the hollow portion 88 of the valve stem 86 of 3-way valve and thus prevent injury to either an operator or damage to the press.

The safety device hereinbefore described, it will be appreciated, is subject to modification in constructional features and also subject to various uses within the range of engineering skill, without departing from the spirit of the invention as defined in the appended claims.

What I claim is:

1. In combination with a power press or the like having a clutch-controlled movable head, of pneumatic safety control means for engaging and releasing the clutch, said safety control means comprising a clutch-tripping lever, an air pressure responsive device, means responsive to the movement of the air pressure responsive device upon admission of air under pressure thereto to operate the clutch-tripping lever, a pilot valve for controlling the admission of compressed air to said air responsive device, an exhaust valve for venting the compressed air admitted to the pressure responsive device, cam means movable with the movement of the movable head of the press for controlling the opening and closing of the exhaust valve, a conduit connecting the pilot valve with the pressure responsive device, a check valve in said conduit adapted to open under air pressure from the pilot valve, and a pneumatic circuit having therein a cutout valve adapted to permit only a puff or surge of air to pass through the circuit, the pilot valve comprising a three-way valve having a plurality of ducts, one leading to the pressure responsive device, one connecting with a source of compressed air, and one leading to the atmosphere, and a normally seated check valve which, when seated, closes off communication between the first two ducts and establishes communication between the first duct and the atmosphere, and a pilot operating mechanism which is responsive to a surge of compressed air from the pneumatic circuit to open the valve check in the three-way valve to admit compressed air from the source to the pressure responsive device, and means on the pilot operating mechanism operable by the pressure responsive device after it has been acted upon by the compressed air to permit valve check of the pilot valve to close.

2. The combination according to claim 1 wherein the air pressure responsive device is a cylinder within which is movable a piston and wherein the check valve in the conduit leading from the pilot valve to the cylinder is located between the exhaust valve connected with the cylinder and the pilot valve.

3. The combination according to claim 1 wherein the pneumatic circuit in addition to having the cut-out valve has two manually operable valves, one in the circuit in advance of and the other beyond the cut-out valve, and which three valves in series are adapted to permit only a surge of compressed air to pass through the circuit when the manually unseatable valves are sequentially or simultaneously opened to operate the pilot operating mechanism.

4. The combination according to claim 1 wherein the pneumatic circuit in addition to having the cut-out valve has two manually operable valves, one in the circuit in advance of and the other beyond the cut-out valve, and which three valves in series are adapted to permit only a surge of compressed air to pass through the circuit when the manually unseatable valves are sequentially or simultaneously opened to operate the pilot operating mechanism, and means for closing the pilot valve immediately after air passing therethrough has acted upon the pressure responsive device to trip the clutch.

5. In combination with a power press or the like having a clutch-controlled movable head, of pneumatic safety control means for engaging and releasing the clutch, said safety control means comprising a cylinder assembly unit consisting of a cylinder, a spring-biased piston movable within said cylinder, clutch-control means responsive to the movement of the piston upon admission of compressed air into the cylinder for operating the clutch control means to cause operative movement of the movable head, valve means for controlling the admission of compressed air to the cylinder, an exhaust valve in open communication with the interior of the cylinder and means carried by a movable part of the press for controlling the venting of the air from the cylinder through the exhaust valve to permit the spring biased piston to return the clutch-control means to clutch holding position, of a check valve in the conduit connecting the cylinder and the valve means for controlling the admission of compressed air to the cylinder, said check valve being adapted to open under air pressure flowing to the cylinder and venting means in said conduit normally open to atmosphere but closed when the valve means for controlling the admission of compressed air to the cylinder is open.

6. In combination with a power press operating pneumatic safety control means acording to claim 5 wherein the venting means in the conduit forms part of a 3-way valve which includes the valve means for controlling the admission of compressed air to the cylinder.

JOSEPH CHOCHOL.

REFERENCES CITED

The following references are of record in the file of this patent:

UNITED STATES PATENTS

| Number | Name | Date |
|---|---|---|
| 1,768,531 | Walsh | June 24, 1930 |
| 2,253,544 | Williams | Aug. 26, 1941 |
| 2,268,733 | Wiliams | Jan. 6, 1942 |

Certificate of Correction

Patent No. 2,423,482.  July 8, 1947.

JOSEPH CHOCHOL

It is hereby certified that errors appear in the printed specification of the above numbered patent requiring correction as follows: Column 8, line 24, strike out the word "left"; column 10, line 35, claim 1, after "permit" insert *the*; and that the said Letters Patent should be read with these corrections therein that the same may conform to the record of the case in the Patent Office.

Signed and sealed this 26th day of August, A. D. 1947.

[SEAL]

LESLIE FRAZER,
*First Assistant Commissioner of Patents.*